United States Patent
Kuittinen et al.

(10) Patent No.: US 9,248,757 B2
(45) Date of Patent: Feb. 2, 2016

(54) ROCK DRILLING RIG AND METHOD FOR POSITIONING THE SAME

(75) Inventors: Jarno Kuittinen, Tampere (FI); Juha Piipponen, Tampere (FI); Timo Niemi, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 493 days.

(21) Appl. No.: 13/635,040

(22) PCT Filed: May 24, 2011

(86) PCT No.: PCT/FI2011/050471
§ 371 (c)(1),
(2), (4) Date: Sep. 14, 2012

(87) PCT Pub. No.: WO2011/148053
PCT Pub. Date: Dec. 1, 2011

(65) Prior Publication Data
US 2013/0008716 A1    Jan. 10, 2013

(30) Foreign Application Priority Data
May 25, 2010    (FI) .................................. 20105576

(51) Int. Cl.
*E21B 44/00*    (2006.01)
*B60L 15/20*    (2006.01)
(Continued)

(52) U.S. Cl.
CPC ......... *B60L 15/2009* (2013.01); *B60L 11/1803* (2013.01); *B60W 30/18063* (2013.01); *E21B 7/022* (2013.01); *E21B 7/025* (2013.01); *B60L 2200/40* (2013.01); *B60L 2220/46* (2013.01); *B60L 2240/423* (2013.01); *B60L 2250/16* (2013.01); *B60L 2260/28* (2013.01); *B60W 10/08* (2013.01); *B60W 30/143* (2013.01); *B60W 2300/17* (2013.01); *Y02T 10/6208* (2013.01); *Y02T 10/642* (2013.01); *Y02T 10/7005* (2013.01); *Y02T 10/7275* (2013.01)

(58) Field of Classification Search
USPC ........ 175/24, 57, 40, 389, 414; 318/597, 503, 318/703, 807, 801; 701/50, 93
See application file for complete search history.

(56) References Cited

U.S. PATENT DOCUMENTS 5,467,275 A    11/1995    Takamoto et al.
7,191,060 B2 *    3/2007    Makela .................. 701/410
(Continued)

FOREIGN PATENT DOCUMENTS

WO    2008/077352    7/2008

OTHER PUBLICATIONS

International Search Report for PCT/FI2011/050471 dated Oct. 13, 2011.

(Continued)

*Primary Examiner* — Taras P Bemko
(74) *Attorney, Agent, or Firm* — Morgan, Lewis & Bockius LLP

(57) ABSTRACT

The invention relates to method for positioning a rock drilling rig and to a rock drilling rig. The rock drilling rig is moved using combustion-engine-free drive equipment with an electric drive motor. The torque is transmitted from the drive motor to the traction wheels over a mechanical anti-slip transmission connection. The ratio between the drive motor rotation rate and the traction wheel rotation rate is kept constantly the same during positioning. The drive motor is not only used for moving but also for stopping.

11 Claims, 4 Drawing Sheets

(51) Int. Cl.
*B60L 11/18* (2006.01)
*B60W 30/18* (2012.01)
*E21B 7/02* (2006.01)
*B60W 10/08* (2006.01)
*B60W 30/14* (2006.01)

(56) References Cited

U.S. PATENT DOCUMENTS

| 7,477,967 | B2 * | 1/2009 | Makela | 701/23 |
| 2006/0120892 | A1 | 6/2006 | Muona et al. | |
| 2008/0243350 | A1 * | 10/2008 | Harkness | 701/93 |
| 2010/0000811 | A1 * | 1/2010 | Iwano | 180/65.51 |
| 2010/0030415 | A1 | 2/2010 | Tang | |
| 2010/0086359 | A1 | 4/2010 | Saleniemi | |
| 2010/0090623 | A1 * | 4/2010 | Yang | 318/14 |

OTHER PUBLICATIONS

Finnish Office Action and Search Report for Application No. 20105576, dated Mar. 15, 2011.

* cited by examiner

ROCK DRILLING RIG AND METHOD FOR POSITIONING THE SAME

RELATED APPLICATIONS

The present application is a U.S. National Phase Application of International Application No. PCT/FI2011/050471 (filed 24 May 2011) which claims priority to Finnish Application No. 20105576 (filed 25 May 2010).

BACKGROUND OF THE INVENTION

The invention relates to method for positioning a rock drilling rig. The rock drilling rig is driven to a drilling site for drilling. The rock drilling rig is moved during positioning entirely by means of combustion-engine-free electric drive equipment. The necessary rotation torque is generated with an electric drive motor controlled by a control device. From the drive motor, the rotation torque is transmitted over a transmission connection to the traction wheels.

The invention further relates to a rock drilling rig.

The field of the invention is described in more detail in the preambles of the independent claims.

In mines, rock drilling rigs are used to drill boreholes at planned drilling sites. When the boreholes have been drilled, the mining vehicle is transferred to the next drilling site for drilling a new drilling fan or face. In underground mines, in particular, it is advantageous to perform the transfer drive by means of power produced by an electric motor. The energy required by the transfer drive may be stored in a battery. Exact positioning at a drilling site is often a demanding procedure. The task is further complicated by the fact that the ground may be uneven at the drilling site and the drilling site may be in a narrow tunnel. It is difficult to drive the known rock drilling rigs into drilling sites, because their drive equipment is poorly suited for exact positioning.

BRIEF DESCRIPTION OF THE INVENTION

The object of the present invention is to provide a novel and improved rock drilling rig and a method for positioning the same.

The method of the invention is characterised by transmitting the rotating motion of the drive motor over a mechanical anti-slip transmission connection to the traction wheel; maintaining the ratio between the drive motor rotation rate and traction wheel rotation rate constantly the same during positioning; and only using an electric drive motor to move and stop the rock drilling rig during positioning.

The rock drilling rig of the invention is characterised in that between the electric drive motor and traction wheel, there is a mechanical anti-slip transmission connection; that the rock drilling rig comprises at least one measuring device for determining the speed of the rock drilling rig; and that a control unit has a control strategy, according to which it is adapted to adjust the electric drive motor by means of a control device so that the ratio between the speed and the speed request remains constant.

The idea is that the rotation torque is transmitted from the drive motor over a mechanical anti-slip transmission connection to the traction wheels. In addition, the rotation rate of the drive motor is adjusted during positioning so that its rotation rate in relation to the rotation rate of the traction wheel remains constant. The rock drilling rig is moved toward the required positioning place and it is stopped there by controlling the rotation of the drive motor.

One advantage is that the rock drilling rig can be positioned exactly at the positioning place, which means that navigation, among other things, is trouble-free and quick. In addition, the driving and stopping of the rock drilling rig are controlled, since they are arranged to be done with the drive motor. The improved movement control increases safety, decreases collisions and dents, and also makes positioning more convenient and easier for the operator.

The idea of an embodiment is to use only an electric drive motor to move and stop the rock drilling rig during positioning. The primary brakes of the rock drilling rig, which typically are in connection with the wheels, then need not be used at all. Thanks to this embodiment, positioning is easier to control, because moving and stopping can be controlled without the use of a separate brake. The operator only needs to use one control element during positioning. In addition, the load and maintenance need of the primary brakes decrease. Instead of the primary brakes that are based on friction forces, this embodiment utilises the torque of the drive motor during stopping.

The idea of an embodiment is to use the electric drive motor to keep the rock drilling rig in place. It is then not necessary to use the primary brakes of the rock drilling rig and their parking brake function in keeping the rig in place. Thanks to this embodiment, it is easier to keep the rig positioned in place, because it can be done without using the brakes. The operator need not put any parking brake on separately, but the electric drive motor acts as a type of parking brake and keeps the rig automatically in place, when the speed request value transmitted to the drive motor is zero. In addition, the load and maintenance need of the normal parking brakes decrease.

The idea of an embodiment is to control the rotation of the electric drive motor steplessly by means of at least one frequency converter. With the frequency converter, the electric motor can be controlled so that the movement of the rock drilling rig is prevented when it is stationary. Further, when driving on uneven ground and going over obstacles, for instance, the rock drilling rig is stable to drive, because the rotation rate and torque of the drive motor can be controlled with the frequency converter so that it prevents any sudden uncontrolled motion in both the driving direction and return direction.

The idea of an embodiment is to measure the rotation of at least one component in the drive equipment with at least one sensor. The distance traveled by the rock drilling rig is determined on the basis of this measuring information and the dimension of the traction wheel. The distance information can be displayed to the operator on the user interface of the rock drilling rig control unit. The operator enters manually into the user interface a distance value that is the new destination site for positioning. After this, the control unit drives the rock drilling rig to the entered new destination site. This feature significantly facilitates the operator's work and improves positioning accuracy. The rock drilling rig usually has to be positioned exactly at the drilling site so that the boreholes can be drilled according to a predefined drilling pattern. The location of the rock drilling rig can be measured before navigation and the start of drilling with a measuring device, such as a tunnel laser. When the measuring results show that the rock drilling rig needs yet to be moved a specific distance, such as 50 cm, onward, it is very simple for the operator to enter this distance value into the control unit, which having received a control command, drives the rig automatically to the new position.

The idea of an embodiment is to set in the control unit a highest allowed speed for the positioning drive. The control unit makes sure that the driving speed always remains below the set maximum speed. This embodiment increases safety.

The idea of an embodiment is to set in the control unit a speed range for the positioning drive. The control unit makes sure that the driving speed always remains within the given speed range.

The idea of an embodiment is that the rock drilling rig is positioned at a drilling site with an uneven driving surface. Due to the uneven driving surface, forces that try to affect the rotation of the wheels are directed to the traction wheels. However, during positioning the rotating rate of the drive motor is kept essentially constant in relation to the speed request despite the fact that torsional load changes are directed to the traction wheels.

The idea of an embodiment is that the rock drilling rig is positioned at a drilling site with a sloping driving surface in the driving direction of the rock drilling rig. Due to uphill or downhill driving, forces that try to affect the rotation of the wheels are directed to the traction wheels. However, during positioning the rotating rate of the drive motor is kept essentially constant in relation to the speed request despite the fact that torsional load changes are directed to the traction wheels.

The idea of an embodiment is that the user interface of the control unit has at least one manual control element to give a transfer movement distance request manually to the control unit. The control unit controls the drive motor to implement the defined transfer movement.

The idea of an embodiment is that the user interface of the control unit has at least one manual control element, in which a transfer movement distance value is defined in advance. One instance of use of such a control element generates an actual transfer movement of the rock drilling rig with the distance value defined in advance in said control element. The user interface may have a push button, for instance, and one push of the button provides a distance value of certain size to the control unit. It is very simple for the operator to give a transfer drive distance value to the control unit with this type of control element. The user interface may have a display device, on which the size of the entered distance value is shown. Further, the user interface may have several control elements with a different distance value in each of them.

The idea of an embodiment is that the control unit comprises at least two selectable speed ranges. The operator can select the speed range to be used in the user interface of the control unit. The first speed range may be designed for transfer drives between drilling sites, and the second speed range may be designed for slow positioning drives at the drilling site.

The idea of an embodiment is that the control unit recognizes the highest allowed speed for the run in at least one section of the mine. The control unit takes into consideration the location of the rock drilling rig and the maximum speed data element, into which the highest allowed speed of at least one section of the mine has been defined. When the rock drilling rig is driven in the mine, it may automatically take into consideration any predefined speed limits set for different sections. In addition, the control centre of the mine may change the speed data elements as conditions or traffic density changes, for instance.

The idea of an embodiment is that the user interface of the control unit has at least one manual control element, the deflecting movement of which is of a size proportional to the size of the speed request transmitted to the control device controlling the drive motor. The response of the drive motor to the deflection movement of the manual control element is different for a transfer drive at high speed and for a positioning drive at low speed. In positioning and transfer drives, the movement ranges of the control element may be scaled differently. Further, the motion resistance resisting the deflecting movement of the control element may be different in different driving situations.

The idea of an embodiment is that the rock drilling rig is equipped with at least one tilting sensor to detect a sudden longitudinal tilt and sway of the rock drilling rig. The control unit controls the drive power transmission so as to compensate for the detected movement. Thanks to this embodiment, it is possible to improve the stability of the rock drilling rig.

The idea of an embodiment is that the drive equipment comprises at least one pulse sensor that generates pulses as at least one component belonging to the drive equipment rotates. Measuring data obtained from the pulse sensor is transmitted to the control unit. The control unit controls the rotation of the drive motor on the basis of the measuring data with an accuracy of up to one generated pulse.

The idea of an embodiment is that a mechanical transmission connection comprises at least one gearbox that the drive motor is arranged to drive.

The idea of an embodiment is that the drive motor is an electric hub motor arranged directly on the shaft of the traction wheel.

The idea of an embodiment is to use the primary brakes connected to the wheels of the rock drilling rig only under exceptional circumstances. The drive motor serves as the operating brake, and the primary brakes are only for emergencies. When the stopping and keeping stationary of the rock drilling rig is done by means of the electric drive motor and its control, the operator need not use the brake pedal or a corresponding control element of the primary or parking brakes at all during a normal run. This makes the operator's work easier.

BRIEF DESCRIPTION OF THE FIGURES

Some embodiments will be explained in greater detail in the attached drawings, in which.

In the figures, some embodiments are shown in a simplified manner for the sake of clarity. Similar parts are marked with the same reference numerals in the figures.

DETAILED DESCRIPTION OF SOME EMBODIMENTS

Figure 1:
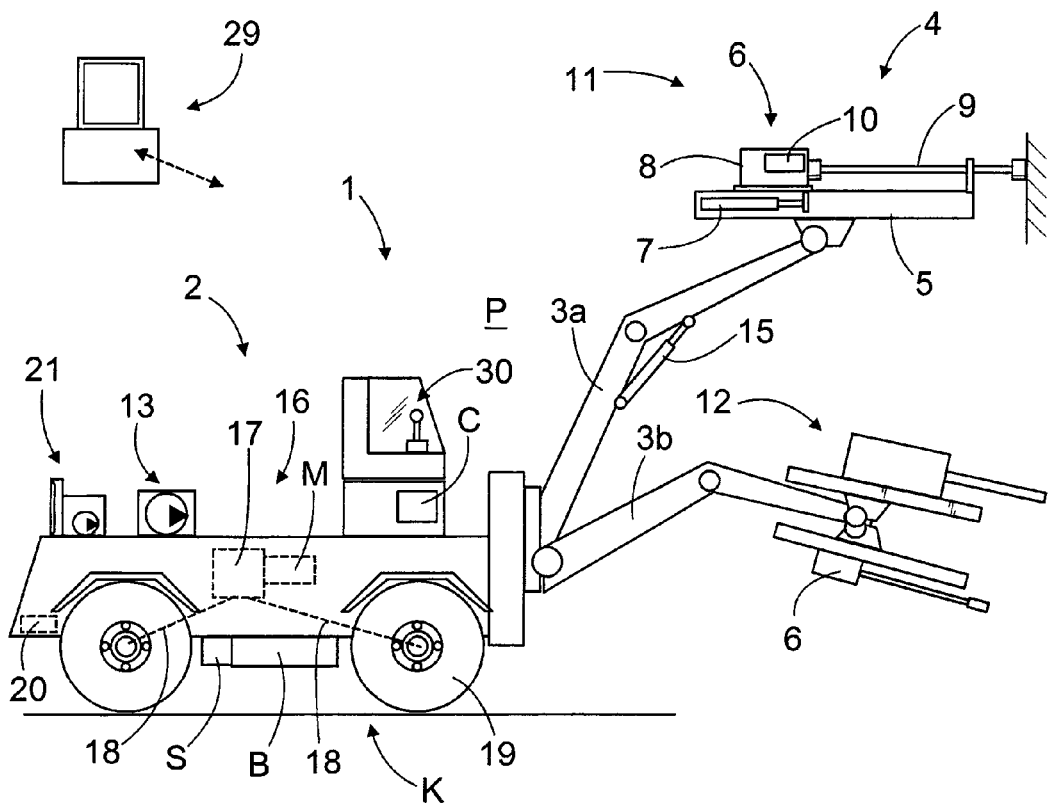
FIG. 1 shows schematically a rock drilling rig, which has been positioned at a drilling site for drilling.

FIG. 1 shows a rock drilling rig 1 comprising a movable carrier 2 which is provided with one or more drilling booms 3a, 3b equipped with a drilling unit 4. The drilling unit 4 may comprise a feed beam 5 provided with a rock drilling machine 6 that may be moved on the feed beam 5 by means of a feed device 7. The rock drilling machine 6 may comprise a percussion device 8 for generating impact pulses on a tool 9, and a rotating device 10 for rotating the tool 9. Further, it may include a flushing device. The boom 3a shown in the figure and the drilling unit 4 arranged thereto are intended for drilling boreholes in a face 11 of a tunnel or a corresponding drilling site. Alternatively, the boom and the drilling unit thereon may be designed for drilling fan-form boreholes in the ceiling and walls of a rock cavern. Further, the rock drilling rig 1 may comprise a boom 3b provided with a bolting device 12 that also has a rock drilling machine 6. The rock drilling rig 1 may comprise a hydraulic system 13 that includes a hydraulic pump 34, hydraulic channels, a tank, and necessary control means, such as valves and the like. The hydraulic system 13 may be a drilling hydraulic system, to which actuators 15 necessary for moving the drilling booms 3a, 3b and the rock drilling machine 6 are connected. The rock drilling rig 1 also comprises one or more control units C arranged to control the systems of the rock drilling rig 1. The control unit C may be a computer or a corresponding control device comprising a processor, a programmable logic or any other control device suitable for the purpose, to which it is possible to set at least one control strategy, according to which it carries out controlling independently or in cooperation with the operator. The control unit C may be in connection to the control system 29 of the mine, from which it is possible to transmit drilling patterns, information about drilling sites and transfer drives, route information, and other instructions and information for the purpose of operating in the mine.

The rock drilling rig 1 is positioned at a drilling site P for drilling one or more boreholes. Typically, the drilling is done according to a pre-drafted drilling pattern. When the tasks defined for the drilling site P have been completed, the rock drilling rig 1 is transferred away from the drilling site P to a new drilling site or somewhere else, for instance to be serviced. The rock drilling rig 1 is provided with drive equipment 16 which does not include a combustion engine, i.e., it is combustion-engine-free. Instead, the drive equipment 16 includes one or more electric motors M, which generate the power required in the transfer drive. The electric motor M may be connected to a gearbox 17, from which rotating power is transmitted through shafts or corresponding power transmission members 18 to one or more wheels 19. The energy required in the transfer drive may be charged to an energy storage B, which may be a battery, for instance. The drive equipment 16 may additionally include one or more control devices S and one or more brake resistors 20.

FIG. 1 also shows a manual control element 30, by which the operator may transmit a request on driving speed and power to the control unit C, which controls the electric drive system on the basis of the transmitted request. The control element 30 thus constitutes part of the user interface of the control unit C. The control element 30 may comprise a mechanical structure or it may be implemented by software on a display or in a corresponding manner.

The rock drilling rig 1 may further be provided with a liquid cooling system 21, by which it is possible to cool the electric components K included in the drive equipment 16, which means that thanks to the cooling, they may be loaded more during the run.

Figure 2:
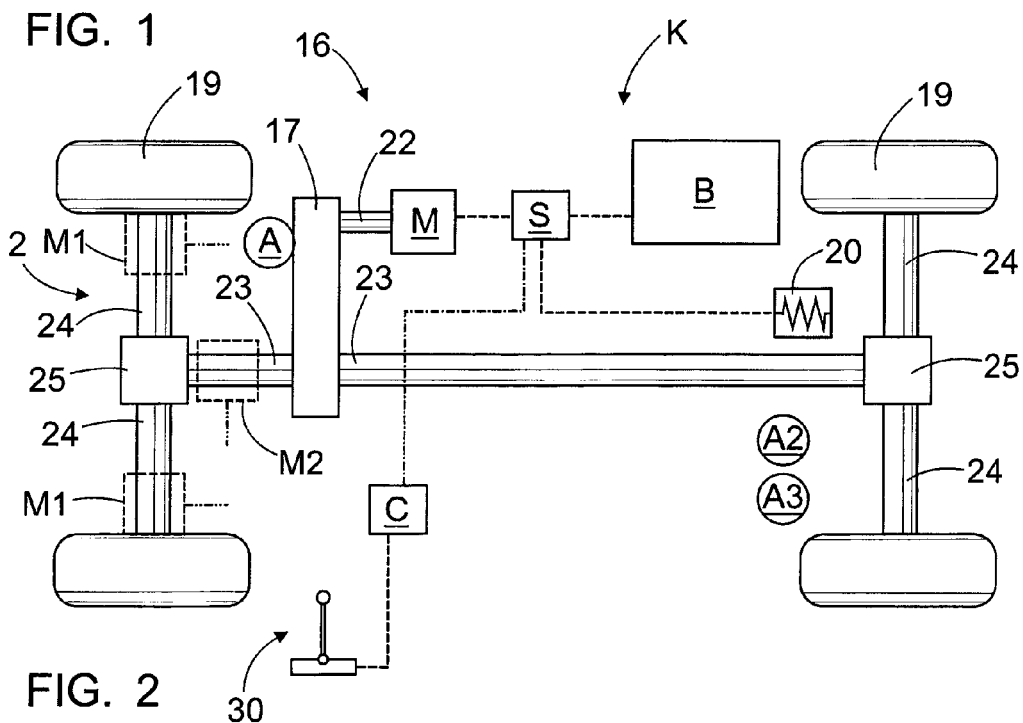
FIG. 2 shows schematically drive equipment with an electric drive motor connected to the traction wheels over a mechanical anti-slip transmission connection.

FIG. 2 illustrates drive equipment 16, in which the electric motor M may be coupled through an anti-slip transmission path 22 directly to the gearbox 17, which may include one, two or more gears in the driving direction and correspondingly in the reverse direction. The rotation torque may be transmitted from the gearbox 17 to wheel shafts 24 by means of shafts 23. An angle drive 25 or the like may be arranged between the shafts 23 and 24. In that case, between the wheels 19 and the electric motor M, there is mechanical anti-slip transmission. The electric motor M may also be used for braking. In long-term braking, the electric motor M may serve as a generator and convert kinetic energy of the carrier 2 into electric energy when driving down the drive ramps in the mine, for instance. Generated electric energy may be charged to an energy storage B and thus recovered. Excess electric energy, which cannot be utilized, may be converted into thermal energy in the brake resistor 20. The drive equipment 16 further includes a control device S, which may comprise a frequency converter, by which the rotation of the electric motor M may be controlled steplessly both during driving and braking. The electric drive system may further comprise other necessary electric control devices for controlling electric currents.

The operator may control the moving of the carrier 2 forward and backward by giving a speed request with the control element 30 to the control unit C. Further, when the control element 30 downsizes the speed request, the drive equipment 16 decelerates the speed of the carrier 2 without needing to use the brakes. When the carrier 2 is positioned, the control element 30 may change the value of the speed request to zero, in which case the drive equipment 16 maintains the carrier 2 stationary.

The rock drilling rig 1 may be provided with one or more measuring devices A-A3 to determine the speed of the carrier 2. The rotation of a rotating component in the drive equipment 16 may be measured with the measuring device A. The measuring device A may be a pulse sensor, for instance, arranged to the gearbox 17 or a shaft. The measuring data is transmitted to the control unit C that calculates the speed of the carrier. It is also possible to define the speed of the carrier 2 by using other measuring devices. The measuring device A2 may be a radar that determines the speed in relation to the driving surface, the wall surfaces or ceiling of the mining tunnel. Further, a measuring device A3 can be used that is connected to an external reference point to determine the speed. The measuring device A3 may then have a data communication link to base stations, satellites, or radio beacons.

FIG. 2 shows, marked with broken lines, yet another alternative embodiment, in which the electric drive motor is rigidly coupled to the power transmission means. In connection with the shaft 24 on the left, there are wheel-specific electric pole motors M1 which may have the necessary gearbox connected thereto. Further, rotation torque may be provided to the shaft 24 by means of one common electric drive motor M2.

Figure 3:
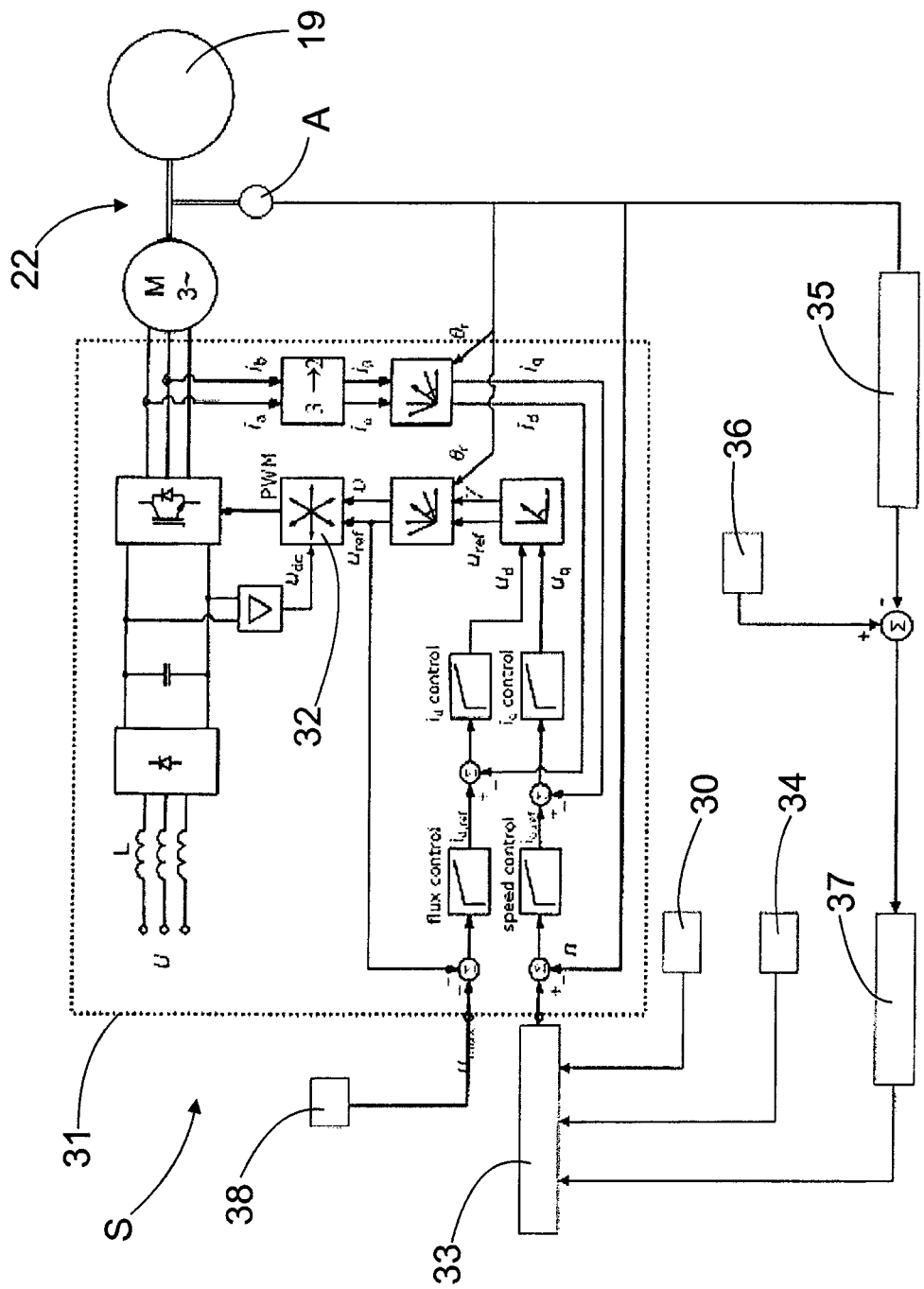
FIG. 3 shows schematically a diagram of the electric drive system.

FIG. 3 is a diagram illustrating a possible implementation of the electric drive system. The drive motor M may be a short-circuit motor controlled by a frequency converter. The drive motor M is connected to the traction wheels 19 with a mechanical anti-slip power transmission path 22. For the sake of clarity, FIG. 3 does not show a gearbox or other elements related to power transmission. An internal control circuit 31 of the frequency converter is marked in the figure by a dashed line. Graphical symbol 32 illustrates the fact that with the frequency converter, it is possible to control the rotating electric field of the drive motor M. A selection unit 33 provides the control circuit 31 with a reference value for the rotation rate of the drive motor M. The operator may affect the size of this reference value with the control element 30. Further, it is possible to affect the reference value with a system controller 34 that may be a constant-speed controller with which the control system controls the speed. Information on the measured actual speed is also transmitted to the selection unit 33. The driving power transmission may have a measuring device A, such as an angular speed sensor, the signal of which is converted into distance, which is illustrated by box 35. The reference value of the targeted location or transition is shown by box 36. Box 37 is a positional controller that comprises a limit value for the speed of the rock drilling rig. The positional controller 37, too, is connected to the selection unit 33. The diagram also has box 38 for entering a torque reference value, which is in practice a current reference value for the control circuit 31. With this torque or current reference value, the control system allows or limits the maximum torque reference value as required, for instance according to the heating up of a component. The control circuit 31 regulates the control system so that the load torque and drive motor torque are always the same.

In this application, a frequency converter refers to a control device by which the rotation rate of the electric drive motor can be controlled in a stepless manner. The frequency converter may be an inverter or it may be a DC/AC converter, which controls the running of the electric motor.

Figure 4:
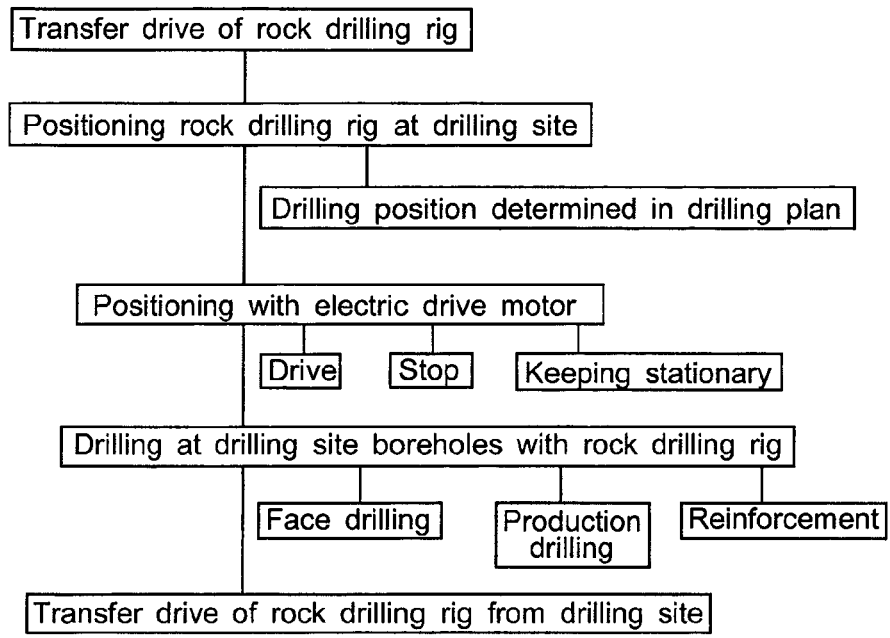
FIG. 4 is a diagram illustrating the operations performed with the rock drilling rig.

FIG. 4 is a simplified diagram illustrating the positioning according to the invention. The issues presented in the figure are described in chapter "Brief description of the invention".

Figure 5:
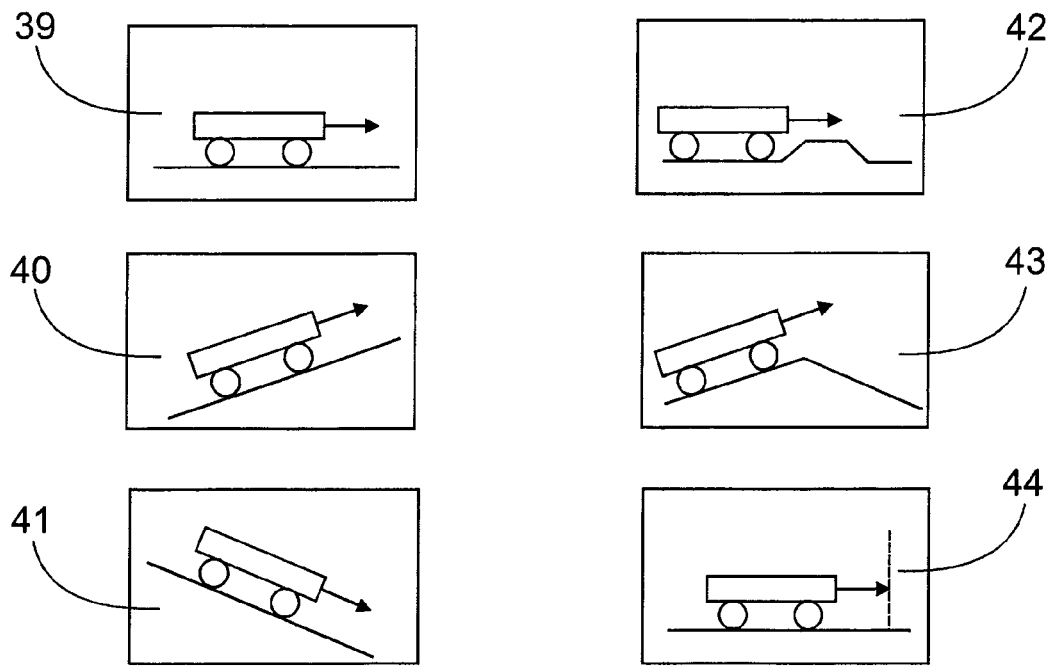
FIG. 5 shows schematically some driving situations, where the drive equipment of the invention facilitates the work of the operator.

FIG. 5 illustrates situations, in which the drive equipment of the invention is especially useful. For a transfer drive 39, the control system may comprise a constant-speed controller that maintains constant speed and facilitates the work of the operator. When driving uphill 40, the control system keeps the speed set even though the torsional load directed to the traction wheels increases. In downhill 41 driving, the device, in turn, tries to increase the speed, but then the drive motor decelerates and prevents the speed from increasing from the set rate. When driving over an obstacle 42, the system permits good control of movements and, thus, precise driving. When driving on an uneven ground 43, it is possible to avoid sudden movements of the carrier when the force opposing the advance of the carrier diminishes suddenly. The carrier may also be moved on the basis of a precisely entered distance value 44, whereby the carrier may be driven even 1 cm at a time.

Figure 6:
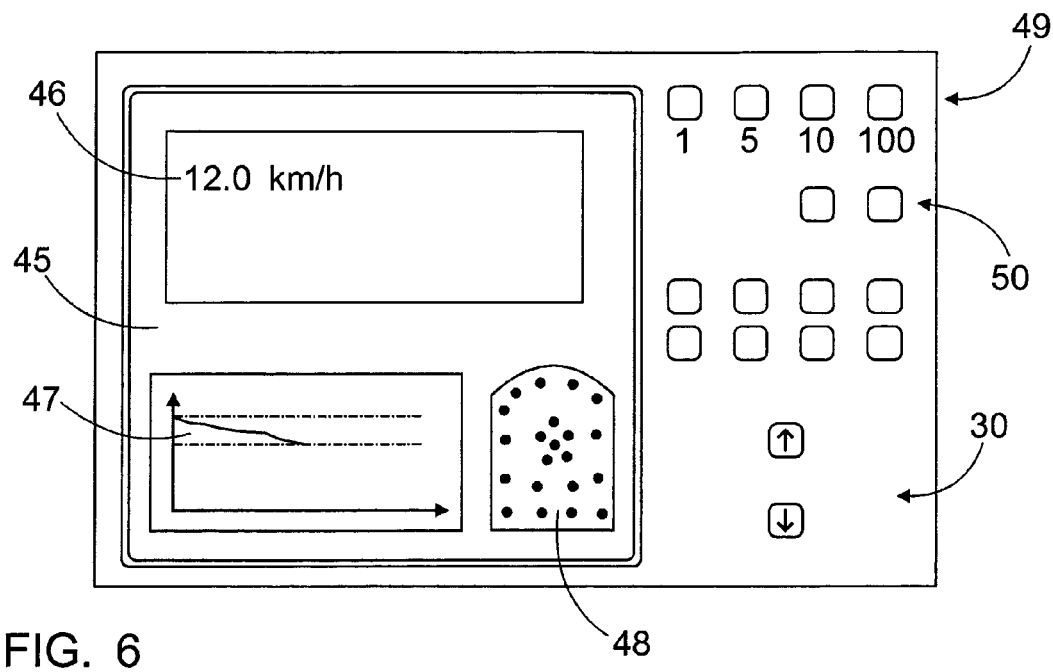
FIG. 6 shows schematically a user interface of the control unit.

FIG. 6 shows one possible user interface of the control unit C having one or more display devices 45. The speed 46 of the rig and possible speed ranges 47 and speed limits can be displayed to the operator on the display device 45. Further, the display device 45 may display information related to drilling, such as the drilling pattern that may define the locations, numbers, and directions of the boreholes to be drilled, as well as the exact location of the drilling site as coordinates, for example. The user interface may have selection elements, such as push buttons 49, the use of which makes the drive equipment move the carrier a predefined distance. Further, speed and distance information may be provided to the control system by electric control elements 30 that the operator uses manually. The user interface may also have selection elements 50 for selecting different speed ranges. It is then possible to select a specific drive mode for positioning, in which the moving of the carrier may take place more precisely and in a more controlled manner than in a drive mode intended for the transfer drive.

Figure 7:
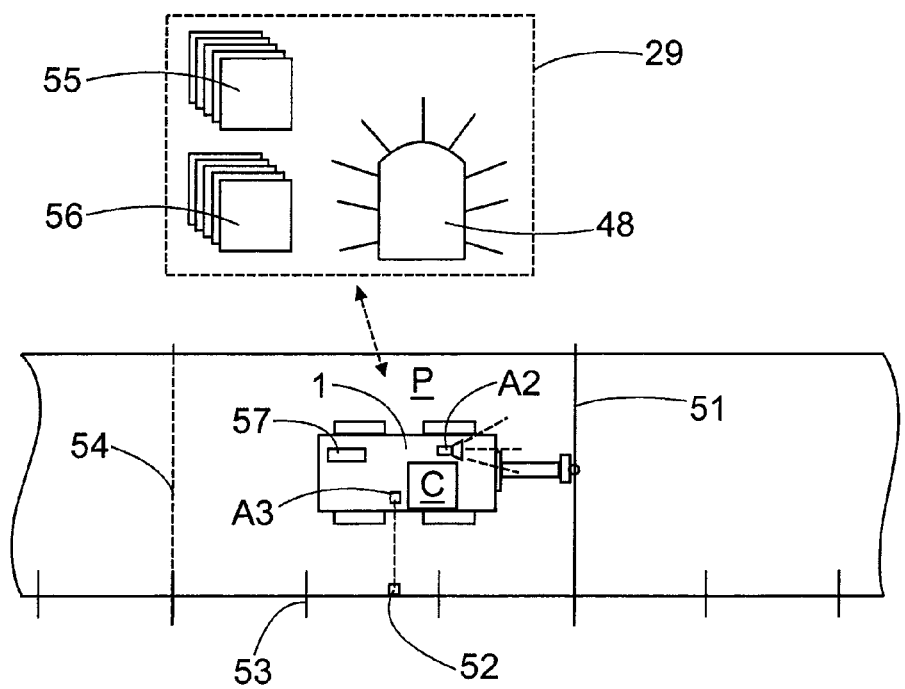
FIG. 7 shows schematically and from the top the positioning of the rig to a fan-form drilling site.

FIG. 7 illustrates the positioning of the rock drilling rig 1 to a drilling site P for drilling a set of boreholes in fan-form. Information on the drilling site P and drilling pattern 48 may be transmitted from the control system 29 of the mine to the control unit C. The drilling pattern 48 may define the navigation plane 51 that defines the location of the pattern in the rock cavern. The position of the rock drilling rig 1 may be defined by measuring with the help of a scanner A2 the location of the surfaces in the rock cavern in relation to the rock drilling rig, or the position may be defined by receiving a signal from a transmitter 52 to a receiver A3. The operator may then be shown the distance to the planned navigation plane 51 on the display device. The mining vehicle may also have means for dead reckoning, in which case it continuously measures the direction and distance. The mine may have peg numbers 53, that is, distances from a predefined reference position. It is also possible to define the distance to the navigation plane 51 with these peg numbers 53. A location 54 may be defined in advance in the mine, where the carrier shifts to positioning drive. FIG. 7 also shows that the control system 29 of the mine may comprise data elements 55, with which it is possible to affect the speed used in positioning and transfer drives, for instance. When the position of the rock drilling rig 1 is known in the mine, the speed may be set below the maximum allowed speed that may be defined in a maximum speed data element 56, to which data element 56 the different allowed speeds in different sections of the mine are defined. The rock drilling rig 1 may also be equipped with a tilting sensor 57 to detect sudden longitudinal tilt and sway of the carrier 2. These movements can be compensated by controlling the drive power transmission 16 with the control unit C to provide suitable counter-forces.

It may also be possible to use the above-mentioned drive equipment for transfer drives. A solution suitable for transfer drives comprises the following features: driving the rock drilling rig by means of a combustion-engine-free drive equipment, in which the required rotation torque is generated by at least one electric drive motor which is controlled by at least one control device and from which the rotation torque is transmitted over a transmission connection to at least one traction wheel; entering into the user interface of the control unit a speed request to the control device that sets a reference value for the control device for adjusting the rotating rate of the drive motor and for implementing the speed request; transmitting the rotation motion of the drive motor over a rigid transmission connection to the traction wheel; measuring the actual rotating rate of the drive equipment and defining the speed of the rock drilling rig; comparing the obtained speed with the speed request; and adjusting the control value of the control device to set the speed to correspond to the speed request.

Although the drive equipment of the rock drilling rig is completely without a combustion engine, the carrier of the rock drilling rig may have a reserve power unit that may comprise a combustion engine. This combustion engine drives a generator for producing electric energy. The reserve power unit is not, however, included in the drive equipment, and it is only intended for use in special situations, for instance when the battery is flat or damaged.

In some cases, features disclosed in this application may be used as such, irrespective of other features. On the other hand, features disclosed in this application may, if required, be combined to form various combinations.

The drawings and the related description are only intended to illustrate the idea of the invention. Details of the invention may vary within the claims.

The invention claimed is:

1. A rock drilling rig, comprising:
a movable carrier having a plurality of wheels,
combustion-engine-free drive equipment for driving the rock drilling rig, which drive equipment comprises at least one electric drive motor, at least one control device for controlling the electric drive motor, and power transmission members between the electric drive motor and at least one traction wheel,
at least one boom movable in relation to the carriage, at least one rock drilling machine arranged on the at least one boom, at least one control unit that has a user interface for entering a speed request, a mechanical anti-slip transmission connection between the electric drive motor and the traction wheel, and at least one measuring device for determining the speed of the rock drilling rig, wherein the control unit has a control strategy, according to which the control unit is adapted to adjust the electric drive motor by means of the control device so that the ratio of the speed to the speed request remains constant regardless of the changes in torque load directed to the traction wheel and caused by an uneven or sloped driving surface, and wherein the highest allowed speed for the rock drilling rig is given to the control unit, the control unit is adapted to control the drive equipment so that the speed is always below the highest allowed speed, and the control unit is adapted to detect the highest allowed speed on at least one section of the mine by taking into consideration the location of the rock drilling rig and a maximum speed data element, into which data element the highest allowed speed of at least one section of the mine has been defined.

2. A rock drilling rig as claimed in claim 1, wherein the transmission connection is anti-slip in both driving directions of the rock drilling rig, whereby the movement of the rock drilling rig into a first driving direction always requires that the electric drive motor rotate in a first direction and, correspondingly, the movement of the rock drilling rig into an opposite, second driving direction always requires that the electric drive motor rotate into an opposite, second rotation direction, and wherein the control device for controlling the electric drive motor is a frequency converter, whereby the electric drive motor has stepless rotation rate and torque control.

3. The rock drilling rig as claimed in claim 1, wherein the drive equipment comprises at least one sensor for detecting the rotation of at least one component in the drive equipment, the control unit is adapted to determine the distance traveled by the rock drilling rig on the basis of the measuring information and the dimension of the traction wheel, and the control unit has a user interface for displaying distance information to the operator.

4. The rock drilling rig as claimed in claim 1, wherein the drive equipment comprises at least one sensor for detecting the rotation of at least one component in the drive equipment, the control unit is adapted to determine the distance traveled by the rock drilling rig on the basis of the measuring information and the dimension of the traction wheel, the control unit has a user interface for displaying distance information to the operator, the user interface of the control unit has at least one manual control element for providing a transfer movement distance request manually to the control unit, and the control unit is adapted to control the electric drive motor to implement the defined transfer movement.

5. A rock drilling rig as claimed in claim 1, wherein the drive equipment comprises at least one sensor for detecting the rotation of at least one component in the drive equipment, the control unit is adapted to determine the distance traveled by the rock drilling rig on the basis of the measuring information and the dimension of the traction wheel, the control unit has a user interface for displaying distance information to the operator, the user interface of the control unit has at least one manual control element, in which a transfer movement distance value is defined in advance, and one instance of use of the control element generates an actual transfer movement of the rock drilling rig with the distance value defined in advance in said control element.

6. A rock drilling rig as claimed in claim 1, wherein the control unit comprises at least two selectable speed ranges, the first speed range is for transfer drive between drilling sites, and the second speed range is for positioning at the drilling site.

7. A rock drilling rig as claimed claim 1, wherein the user interface of the control unit has at least one manual control element, the deflecting movement of which is of a size proportional to the size of the speed request transmitted to the control device controlling the electric drive motor, and the actual response of the electric drive motor to the deflection movement of the manual control element is different for a transfer drive at high speed and for a positioning drive at low speed.

8. A rock drilling rig as claimed in claim 1, wherein the rock drilling rig is equipped with at least one tilting sensor to detect a sudden longitudinal tilt and sway of the rock drilling rig, and the control unit is arranged to control the drive power transmission to compensate for the detected movement.

9. A rock drilling rig as claimed in claim 1, wherein the drive equipment comprises at least one pulse sensor that generates pulses as at least one component belonging to the drive equipment rotates, and the rotation of the electric drive motor is controllable with an accuracy of up to one generated pulse.

10. A rock drilling rig as claimed in claim 1, wherein the mechanical transmission connection comprises at least one gearbox that the electric drive motor is adapted drive.

11. A rock drilling rig as claimed in claim 1, wherein the electric drive motor is an electric hub motor arranged directly on a shaft of the traction wheel.

* * * * *